United States Patent [19]

Margraf

[11] 4,156,599
[45] May 29, 1979

[54] FILTERING SEPARATORS FOR CLEANING GASES

[76] Inventor: Adolf Margraf, Am Schleplingsbach 46, 3060 Stadthagen Wendthagen, Fed. Rep. of Germany

[21] Appl. No.: 847,713

[22] Filed: Nov. 2, 1977

[30] Foreign Application Priority Data

Aug. 24, 1977 [DE] Fed. Rep. of Germany ....... 2738119

[51] Int. Cl.² .......................................... B01D 46/04
[52] U.S. Cl. ...................... 55/262; 55/267; 55/302; 55/341 R; 55/DIG. 25
[58] Field of Search ............. 55/125, 126, 233, 257 R, 55/259, 261, 262, 267, 283, 288, 290, 296, 312, 317, 334, 474, DIG. 25, 403

[56] References Cited

U.S. PATENT DOCUMENTS

| | | | |
|---|---|---|---|
| 575,877 | 1/1897 | Chubb | 55/233 |
| 805,305 | 11/1905 | Lieber | 55/233 |
| 1,549,158 | 8/1925 | Smith | 55/474 |
| 2,125,574 | 8/1938 | Knight et al. | 55/317 |
| 2,806,771 | 9/1957 | Cuthbertson et al. | 55/296 |
| 3,775,949 | 12/1973 | Wächter | 55/312 |
| 3,834,123 | 9/1974 | Margraf | 55/DIG. 25 |
| 3,859,066 | 1/1975 | Trutzschler | 55/403 |
| 3,926,593 | 12/1975 | Squires et al. | 55/262 |

FOREIGN PATENT DOCUMENTS

| | | | |
|---|---|---|---|
| 643015 | 9/1928 | France | 55/296 |
| 117,657 | 6/1958 | U.S.S.R. | 55/262 |
| 144824 | 4/1962 | U.S.S.R. | 55/233 |
| 144825 | 4/1962 | U.S.S.R. | 55/233 |
| 381368 | 11/1973 | U.S.S.R. | 55/283 |

*Primary Examiner*—Frank W. Lutter
*Assistant Examiner*—David L. Lacey
*Attorney, Agent, or Firm*—Kinzer, Plyer, Dorn & McEachran

[57] ABSTRACT

A filtering separator for cleaning dust and smoke-particle-laden gases comprising a separator, a duct connected to the gas inlet of the separator and containing dust collector bodies around which the dirty gas flows, means for detaching particles which collect on and between said bodies, said detaching means affording at least intermittent application of vibration force, and means for feeding at least some of said particles to said separator along with the dirty gas.

4 Claims, 7 Drawing Figures

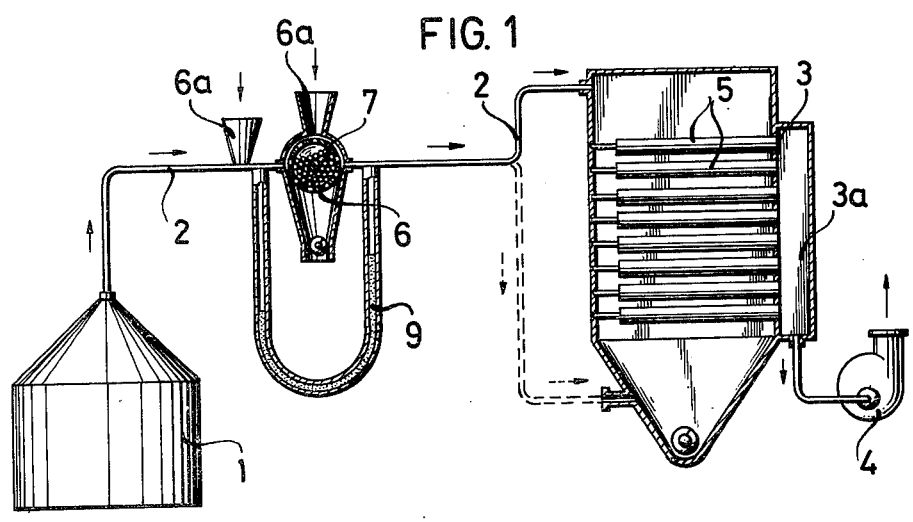
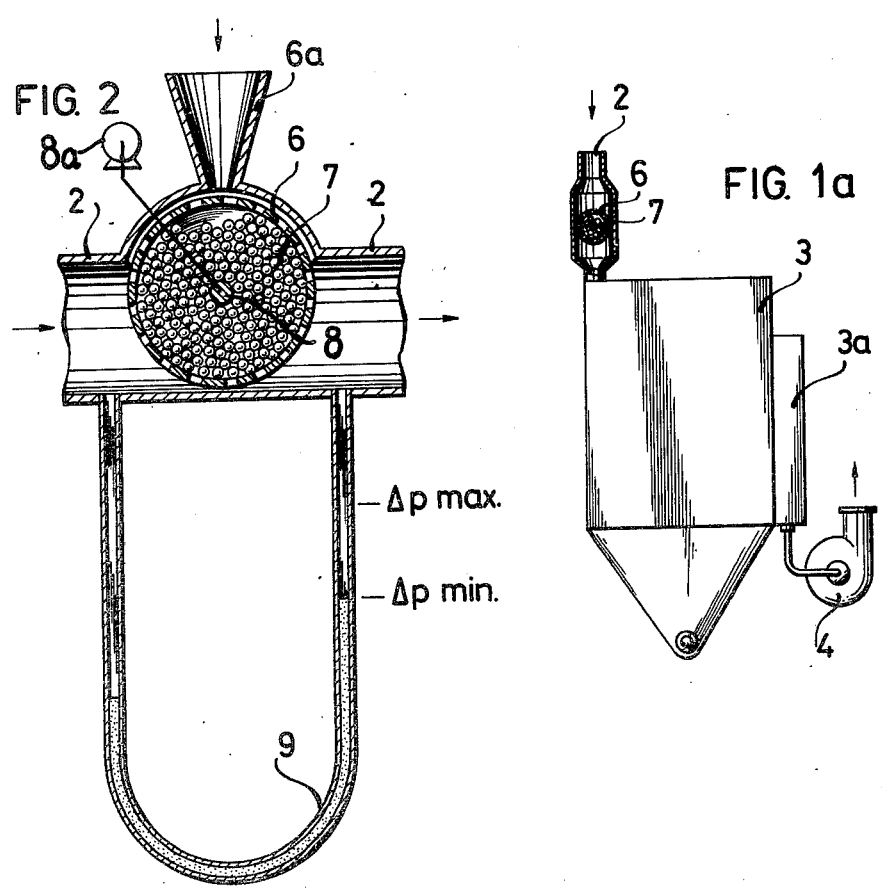

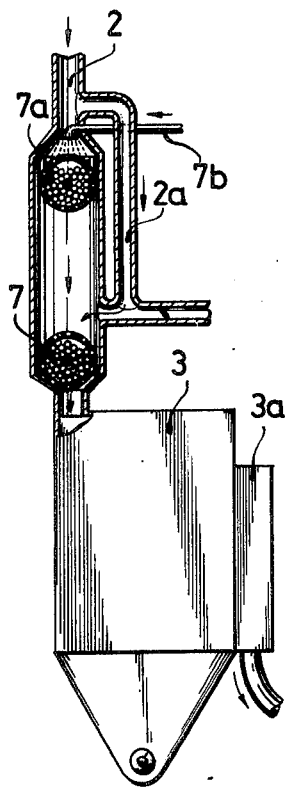
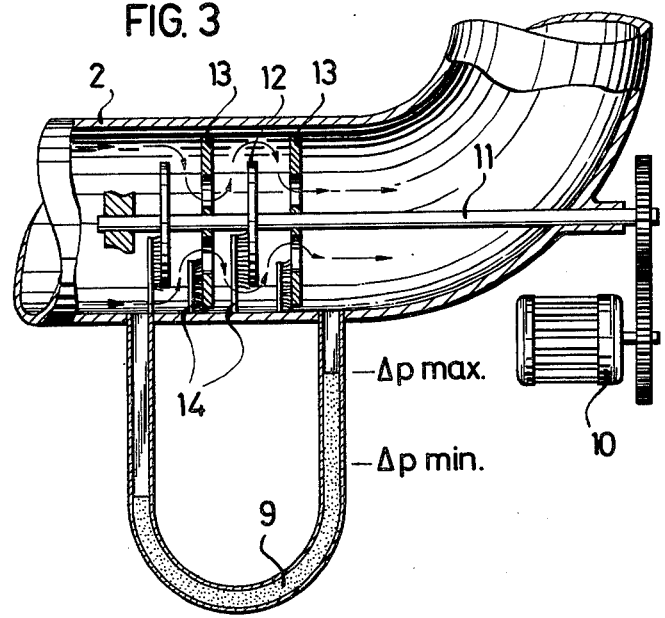
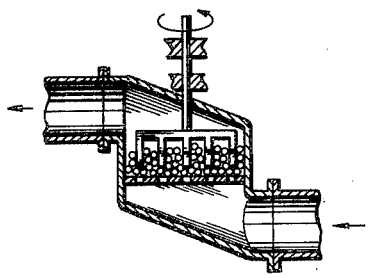
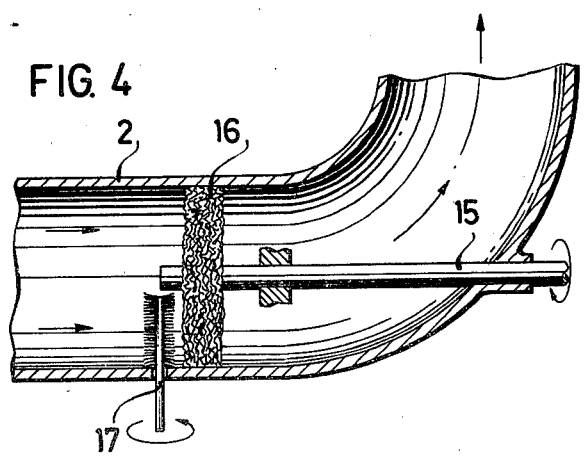

FILTERING SEPARATORS FOR CLEANING GASES

BACKGROUND OF THE INVENTION

The present invention relates to filtering separators, in particular pocket or tube filters, for cleaning smoke or dust-laden gases containing very fine, extremely adherent dust particles.

Certain dust particles, mostly those produced by sublimation and in particular those in smoke-laden gases from certain smelting plants, are very fine and as a result of this it becomes very difficult to separate them out in filtering separators such as pocket or tube filters. This is due to the fact that since the particles have a large surface area in comparison with their small mass they have a particularly pronounced capacity for adhesion and if they collide with some solid object they stick firmly to it and build up on it. Because of the strong forces of adhesion, the result of this build up of dust particles on one another and above all on the filaments of filter pockets or filter tubes is that the dust particles cannot be removed from the filter surfaces to an adequate degree, or in other words can only be partly removed, by known regeneration processes such as counter-current scavenging and/or joggling the filter tubes. This necessarily increases the resistance to flow through the filter, even when the filtering speed is low, to such an extent that the filtering system would in many cases need to be expanded to an economically unreasonable size.

To avoid the retention which occurs on the filter surfaces because of the strong adhesive power of the very fine dust, a prior proposal as disclosed in German patent specification no. 2,113,062; was to make it possible for the filter surfaces to be cleaned by countercurrent scavenging and/or joggling thereof accompanied by repeatedly feeding the dust which is thereby released from the filter surfaces as they are thus periodically cleaned, back to the filter surfaces as an entrainment in the dust-laden gas, so that there is agglomeration of the dust particles while in the suspended (extrained) state immediately before they reach the actual filter surfaces. The layer of dust on the filter surfaces thus remains permeable to gas, as a result of which the resistance of the filter to flow is prevented from becoming too great. This method has proved satisfactory so long as the adhesive power of the very fine dust does not exceed a certain level. If its adhesive power becomes too great, the dust particles which build up on one another and on and in the filter surfaces defy conventional cleaning methods and cling where they are, often remaining hanging in small clumps on the individual filaments. Even if there is provision for the feed-back of dust, this may then result in an irreversible clogging of the filter accompanied by a corresponding reduction in filtering speed and a sharp rise in resistance to flow through the filter.

It is an object of the invention to enable filtering separators, such as pocket or tube filters, in which the periodic cleaning of the filter surfaces is by countercurrent scavenging and/or joggling, to be used even when dust-laden or smoke-laden gases containing extremely adherent very fine dust are to be cleaned.

SUMMARY OF THE INVENTION

This and other objects are achieved in accordance with the invention by having the filtering separator preceded by bodies around which the smoke-laden gas flows, the particles which collect on and between the bodies being detached by an at least intermittent application of force, and by feeding all or some of these particles to the separator along with the smoke-laden gas or removing some of them to the exterior.

The bodies around which flow takes place and to and on which and between which the very fine dust particles from the smoke-laden gas cling and collect, may be spheres, rings or other bodies of regular or irregular shape and they are easily able to be freed of the particles by an at least intermittent application of external force in the form of a forcible movement of the bodies or as exerted by brushes or scrapers, so that the particles are detached and can be picked up by the smoke-laden gas. This being the case, the tendency of the dust particles of strong adhesive power to deposit and collect on and between the bodies is exploited, the dust particles, of which at least some agglomerate, then losing all or at least part of their adhesive power as a result of a kind of aging process. The dust particles detached by the application of force then travel to the filtering separator along with the smoke-laden gas, where they deposit on the filter surfaces and can now, having aged and been preagglomerated as result of the preliminary collection, be periodically freed from the filter surfaces by counter-current scavenging aand/or joggling to clean the surfaces. In accordance with the invention, at least a proportion of the highly adherent dust particles is thus collected temporarily on or between the bodies, and the collected dust, which has aged and agglomerated, is then detached by the application of force and only then is conveyed to the filtering separator along with the dust-laden gas.

A further procedure which may be adopted in accordance with the invention is that the collecting zone formed by the bodies has the following introduced into it, either individually or in combination as desired, (a) dust to provide nuclei of agglomeration for the highly adherent dust particles, (b) additives to bind harmful chemical gases or for the dry neutralisation of acids, (c) water for the evaporative cooling of hot smoke-laden gases, (d) chemically active gases to form desired compounds in the smoke-laden gas.

The beginning and end of the application of force to the bodies are advantageously controlled in accordance with pre-determined values of the resistance to flow through the collecting zone formed by the bodies, so that the application of the vibrating or motion imparting force is initiated when this resistance rises to a preset maximum and is stopped when it falls to a preset minimum.

It may also be advantageous to connect a plurality of collecting zones fromed by bodies in parallel or in series, by which means large quantities of smoke-laden gas can be split up and better control can thus be kept on the time factor for collection, or hot smoke-laden gases may be cooled in one or more collecting zones by feeding in water or aqueous solutions. In this case, one or more of the collecting zones may be bypassed by a side connection for the hot smoke-laden gases, so that, for example the temperature of the cooled smoke-laden gases may be raised again, by mixing, to a temperature suitable for the separator, before the smoke-laden gas flows through the final collecting zone.

A particularly simple way of achieving the object of the invention is for the collecting zone to be formed by a perforated or sieve-like drum in the duct for the smoke-laden gas. This drum is filled with bodies such as spheres, rings or other bodies made of steel, ceramics or other heavy materials, around and through which the smoke-laden gas flows. The drum is set rotating when called for by the increase in flow resistance resulting from the increasing collection of dust particles, with the bodies rubbing against each other as they cascade or vibrate, and is stopped when the resistance to flow has fallen. The rubbing of the bodies against one another and against the walls of the drum loosens and detaches the dust particles which have collected so that they can be carried along in the dust-laden gas to the filtering separator.

Instead of a body-filled drum which can be driven in rotation, the duct for the smoke-laden gas may, at one point, contain a space bounded by sieve-like or perforated plates which holds the bodies, and in which an agitator which can be switched on and off is arranged to enable the bodies to be moved.

In all cases, and in accordance with the invention, the highly adherent fine dust is trapped in the collecting zone formed by the bodies so that it will age and agglomerate, and is then loosened and detached by any desired external mechanical force, so that it can then be fed to the filtering dust-separator and can there easily be freed periodically from the filter surfaces as a result of the characteristics which it has acquired.

BRIEF DESCRIPTION OF THE DRAWINGS

In order that the invention may be more clearly understood, reference will now be made to the accompanying drawings, which schemically show a number of embodiments by way of example and in which:

FIG. 1 is a diagram of a filtering separator installation having an arrangement according to the invention for the temporary collection of highly adherent very fine dust, FIG. 1a is a diagram of a modified arrangement for the collecting zone, FIG. 1b is a diagram showing collecting zones arranged one behind the other in the duct for smoke-laden gas, FIG. 2 is an enlarged-scale section through the collecting zone according to the invention shown in FIG. 1 in the duct for the infeed of gas to the filter and in which is indicated schematically a drive connection for the perforated drum, FIG. 2a shows a collecting zone which is modified as compared with FIG. 2, in the form of a space or container in the gas duct which is filled with bodies and provided with an agitator, FIG. 3 is a diagrammatic longitudinal section through a second modified embodiment of a collecting zone according to the invention, and FIG. 4 is a schematic longitudinal section through another modified embodiment of a collection zone.

DETAILED DESCRIPTION OF PREFERRED EMBODIMENTS

Referring now to the drawings, in FIG. 1, a smoke-laden gas containing very fine dust particles of extreme adhesiveness, e.g. from a smelting furnace 1, is fed via a duct 2 to the top or, as is indicated by a broken line, to the bottom, of a filtering separator, e.g. a pocket or tube filter 3, and the clean gas on the clean gas side 3a is taken away by an extractor. The filter elements 5 are cleaned in a known fashion by countercurrent scavenging and/or joggling.

In a particularly simple and economical embodiment which is shown in FIGS. 1 and 2, a dust-collecting zone consisting of a sieve-like or perforated drum 6, which can be set in rotation at least intermittently, is mounted, advantageously in a widened portion of the gas duct 2, upstream of the separator 3. The drum 6 is filled or almost filled with regular or irregular bodies 7 which are for example spheres and which consists of steel ceramics, stone or other similar materials. As shown in FIG. 2, the perforated drum 6 has a drive shaft 8 which may be driven by a suitable motor 8a so as to vibrate or set in motion the dust collector bodies 7 contained within the perforated drum 6.

The sturdily constructed perforated or sieve-like drum 6 and its filling 7 of spheres (the major dimension of the spheres being 5 to approximately 30 mm for example) is transversed by the smoke-laden gas. The resistance to flow can be kept as low as possible by adjusting the dimensions of the drum and the spheres. As the gas flows through, the extreme adhesiveness of the very fine dust particles causes them to build up on and between the spheres and to agglomerate into larger particles. After a certain period the resistance to flow through the drum and its filling will have increased to a predetermined maximum degree during which period the dust particles also begin to age and their adhesiveness thus begins to decrease, and as soon it has so increased the drum 6 is set rotating. As a result, the spheres 7, as they cascade and move about, rub against one another and thus free the dust which has built up on them and this dust, in an aged and agglomerated form is fed to the filter 3 along with the dust-laden gas, where it deposits on the filter surfaces, and, because of its condition, can easily be cleaned off periodically in a known fashion. When the bodies have become clean, the resistance to flow through the arrangement 6, 7 sinks to a predetermined minimum value and the drive to the drum 6 is switched off so that very fine dust can once again built up on the spheres.

The switching on and off of the drive to the drum advantageously takes place automatically and which is initiated by a pressure-differential measuring device 9 which is shown symbolically in the form of a U-tube.

It is of course possible to fit the arrangement 6, 7 directly in the inlet to the filter, e.g. above the filter housing or inside the filter housing itself, so as to combine it and the filter into a unit. It is also possible to use sufficiently heavy bodies of any other desired shape in place of the spheres 7.

If the smoke-laden gas contains harmful gases or acids, the drum 6 may have associated with it an arrangement 6a which is shown as a funnel and through which additives to bind the harmful gases or for the dry neutralisation of the acids may be introduced directly into the drum or into the duct 2 upstream of the drum.

In the diagram of FIG. 1a, the drum or collecting zone 7 is arranged above the filter housing 3 in the duct 2 for the smoke-laden gas so that agglomerated dust particles which are periodically freed from the bodies 7 by the application of force can drop into the filter 3 with the smoke-laden gas.

Another possibility is to arrange a plurality of collecting zones in parallel in the duct for smoke-laden gas, in order in this way to divide up the flow of smoke-laden gas and thus achieve better control over the time factor, i.e. the time which the dust particles take to collect.

It is however also possible, as the diagram of FIG. 1b shows, to arrange at least two collecting zones of the kind described one behind the other in the duct 2 for smoke-laden gas, this being particularly advantageous in cases where hot smoke-laden gases are to be cleaned and need to be cooled to temperature acceptable to the filter 3. In this case, to replace a conventional cooler, cooling water is fed via a line 7b and nozzles to the collecting zone 7a through which flow first takes place, or to a plurality of successive collecting zones 7a through which flow first takes place, in order to lower the temperature of the smoke-laden gas by the evaporation of the water. So that it is possible to adjust the final temperature of the smoke-laden gas entering the filtering separator 3, a proportion of the hot smoke-laden gases which can be regulated by an adjustable flap may be fed through a bypass line 2a, to the next or last collecting zone 7, thus mixing the cooled smoke-laden gases to extract hot smoke-laden gas, and possibly with external air, in order to arrive at an acceptable temperature for the filtering separator 3. Under certain circumstances aqueous solutions may be employed in place of water so that chemical compounds may be formed with harmful gases or acids.

Finally, it is also possible in a known fashion to feed the dust which is freed and settles inside the separator 3, when the filter surfaces are cleaned, periodically back to the filter surfaces in circuit in the smoke-laden gases, in order to bring about additional agglomeration in the separator 3 of the dust particles which have been pre-agglomerated in the collecting zone without increasing the resistance to flow through the filter and with the object of facilitating yet more the cleaning of the filter surfaces, e.g. by countercurrent scavenging and/or joggling.

It is also possible for dust to be fed to the collection zone 6 or to the gas duct 2 upstream of the collecting zone to provide agglomeration nuclei for the highly adherent dust particles.

I claim:

1. In a filter assembly comprising a housing having a perforated wall separating a dirty gas chamber with a raw gas inlet at the end of a raw gas duct and a clean gas chamber with a clean gas outlet, said dirty gas chamber containing filter elements exposed to the stream of raw inlet gases and adapted to be cleaned periodically by counter-current scavenging from the clean gas side, the improvement that there is interposed in the raw gas duct, upstream of the filter elements, at least one perforated drum containing individual dust collector bodies forming a dust collector in the path of the raw gas, and motion imparting means enabling the bodies in said drum to be placed in motion to cause said bodies to move about and rub against one another to free dust agglomerations thereon to be fed into the raw gas stream moving to the filter elements.

2. Filter assembly according to claim 1 wherein the bodies are in the shape of spheres or rings with a diameter from five to approximately thirty mm.

3. Filter assembly according to claim 1 further comprising two of said perforated drums containing the bodies, and said drums are arranged in series in the raw gas duct, means positioned and arrange with respect to the first or upstream drum for feeding cooling water thereto, and wherein a bypass line for the raw gas is connected at one end to an outlet in the raw gas duct on the upstream side of the first drum and the opposite end is connected to an inlet in the raw gas duct immediately upstream of the second drum.

4. Filter-assembly according to claim 1 wherein the perforated drum has positioned and arranged with respect to it an inlet opening and thereon a feeder for the infeed of dust to provide nuclei for agglomeration on the bodies of the fine dust particles of the raw gases or the infeed of additives to bind harmful gases or to neutralize acids contained in the raw gases.

* * * * *